(12) United States Patent
White (10) Patent No.: US 10,159,231 B1
(45) Date of Patent: Dec. 25, 2018

(54) ADJUSTABLE GEOMETRY FISHING LURE

(71) Applicant: Daniel J White, Waukesha, WI (US)

(72) Inventor: Daniel J White, Waukesha, WI (US)

( * ) Notice: Subject to any disclaimer, the term of this patent is extended or adjusted under 35 U.S.C. 154(b) by 193 days.

(21) Appl. No.: 15/078,831

(22) Filed: Mar. 23, 2016

Related U.S. Application Data (60) Provisional application No. 62/138,213, filed on Mar. 25, 2015.

(51) Int. Cl.
*A01K 85/16* (2006.01)
*A01K 85/01* (2006.01)
*A01K 85/02* (2006.01)

(52) U.S. Cl.
CPC .............. *A01K 85/01* (2013.01); *A01K 85/02* (2013.01); *A01K 85/16* (2013.01)

(58) Field of Classification Search
CPC ........ A01K 85/01; A01K 85/02; A01K 85/16; A01K 85/18
USPC ................. 43/42.24, 42.31, 42.35, 42.36
See application file for complete search history.

(56) References Cited

U.S. PATENT DOCUMENTS

| | | | | |
|---|---|---|---|---|
| 1,472,638 A | * | 10/1923 | Dickman | A01K 85/16 43/42.36 |
| 1,777,004 A | | 9/1930 | Lemera et al. | |
| 2,295,292 A | * | 9/1942 | Rogers | A01K 85/16 43/42.09 |
| 2,659,175 A | * | 11/1953 | Carpenter | A01K 85/16 42/65 |
| 2,861,381 A | | 11/1958 | Snyder | |
| 2,927,393 A | * | 3/1960 | Flamisch | A01K 83/06 43/44.2 |
| 3,408,764 A | * | 11/1968 | McCurry | A01K 85/16 43/42.09 |
| 3,735,518 A | * | 5/1973 | Kleine | A01K 85/18 43/42.03 |
| 3,877,168 A | * | 4/1975 | Stevens | A01K 85/01 43/42.31 |
| 4,033,064 A | * | 7/1977 | Phillips | A01K 85/16 43/42.39 |
| 4,064,646 A | * | 12/1977 | Vercellone | A01K 85/02 43/42.41 |
| 4,136,479 A | | 1/1979 | Pierceall | |
| 4,745,699 A | * | 5/1988 | Gage | A01K 85/16 43/42.09 |
| 4,837,967 A | * | 6/1989 | Dunbar | A01K 85/16 43/42.09 |
| 4,924,618 A | * | 5/1990 | McGahee | A01K 85/02 24/600.9 |

(Continued)

OTHER PUBLICATIONS

Fishing Lures, Mar. 18, 2016, https://www.artmolds.com/applications/fishing-lures.html.

(Continued)

*Primary Examiner* — Lisa L Tsang
(74) *Attorney, Agent, or Firm* — Joseph T. Miotke; DeWitt Ross & Stevens S.C.

(57) ABSTRACT

A fishing lure with an adjustable geometry that can be adjusted as desired by a fisherman. The variably adjustable geometry enables the fisherman to vary and control the spin of the lure, as well as the depth of the lure during trolling. In addition, the adjustable geometry enables the fisherman to orient the lure such that it behaves in a manner similar to a wounded or injured fish, thereby attracting predator fish.

10 Claims, 10 Drawing Sheets

(56) References Cited

U.S. PATENT DOCUMENTS

| | | | |
|---|---|---|---|
| 5,077,930 A | 1/1992 | Berry | |
| 5,412,901 A | 5/1995 | Matinez | |
| 5,926,993 A * | 7/1999 | Marusak | A01K 85/16 43/42.09 |
| 5,926,995 A * | 7/1999 | Dubois | A01K 85/01 43/42.31 |
| 6,662,487 B2 * | 12/2003 | Perrone, Jr. | A01K 85/00 43/42.04 |
| 7,234,266 B2 | 6/2007 | Thomas | |
| 2004/0025406 A1 * | 2/2004 | Kato | A01K 85/16 43/42.24 |
| 2006/0005459 A1 * | 1/2006 | Lehman | A01K 83/06 43/42.15 |
| 2007/0199233 A1 * | 8/2007 | Higgin | A01K 85/16 43/42.09 |
| 2010/0154285 A1 * | 6/2010 | Greenfield | A01K 85/00 43/42.24 |
| 2010/0162612 A1 * | 7/2010 | Kalnas | A01K 85/00 43/42.15 |

OTHER PUBLICATIONS

Plastisol, Mar. 18, 2016, https://en.wikipedia.org/wiki/Plastisol.
Metal Rubber, https://en.wikipedia.org/wiki/Metal_rubber.
Solft Plastic Mold Instructions, 2013, https://www.jannsnetcraft.com/content/downloads/worm_mold_instructions.pdf.

* cited by examiner

ADJUSTABLE GEOMETRY FISHING LURE

CROSS-REFERENCES TO RELATED APPLICATIONS

This application claims the benefit of prior-filed, U.S. Provisional Patent Application No. 62/138,213 filed on Mar. 25, 2015, the entire contents of which are incorporated herein by reference.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

BACKGROUND OF THE INVENTION

The present invention relates to fishing lures, and more specifically to an adjustable geometry fishing lure.

Fishing lures are designed to attract predator fish. The more closely a lure resembles and behaves like a fish upon which the predator fish preys, the more likely it is that the lure will attract such a predator fish. Lures that imitate a wounded or distressed fish typically serve to attract predator fish because predator fish will make opportunistic strikes upon such wounded or distressed fish. Predators can typically detect erratic water displacement created by the wounded or distressed fish. At times, cut bait (e.g., herring cut in half) are used on lines to create movement that simulates the erratic movement of a wounded or distressed fish. One of the challenges associated with using such cut bait are the complex techniques required to affix the cut bait to the fishing lines. Additionally, using such cut or whole herring as bait is typically limited to trolling and cannot be used effectively for use with a casting techniques because such bait will come off the hooks after a few casts because the casting action typically damages the bait.

Conventional lures are typically in a fixed configuration such that the lure is only suitable for use at certain depths and at certain trolling speeds. A continuing need exists for a fishing lure with an adjustable geometry that can be varied based upon the desire and judgment of the fisherman to better simulate the movement of actual.

BRIEF SUMMARY OF THE INVENTION

The present invention provides a fishing lure with an adjustable geometry that can be adjusted as desired by the fisherman. The variably adjustable geometry enables the fisherman to vary and control the spin of the lure, as well as the depth of the lure during trolling. In addition, the adjustable geometry enables the fisherman to orient the lure such that it behaves in a manner similar to a wounded or injured fish, thereby attracting predator fish. In other aspects, the adjustable geometry of the present invention can promote rotation of the lure at desired speeds and patterns.

BRIEF DESCRIPTION OF THE SEVERAL VIEWS OF THE DRAWINGS

FIGS. 7A and 78B are side views of molding plates according to one aspect of the present invention;

DETAILED DESCRIPTION OF THE INVENTION

Referring to FIGS. 1A, 1B, 2A, and 2B, an adjustable geometry fishing lure 10 according to various aspects of the invention are shown. Lure 10 typically comprises a flexible fish body 100, an adjustment plate, or bendable insert 200, and wireform 300. Plate 200 and wireform 300 are typically molded into body 100. Alternatively, plate 200 and wireform 300 could be inserted into body 100 through other suitable means.

1. Body

Referring to FIGS. 1A, 1B, 2A, and 2B, body 100 is typically made from a flexible, resilient material such as soft plastic or rubber material. Body 100 serves to imitate a bait fish, so any suitable material that simulates the look and feel of a bait fish can typically be used for body 100. Body 100 is typically composed of a relatively flexible material because lure 10 can be bent to a desired geometry, and the material used for body 100 should be flexible to allow for such bending. In another aspect, the material used for body 10 should have a density similar to the density of a bait fish. Predator fish typically feel and know the natural weight and water displacement for bait fish, thus making it desirable for body 100 to closely match the weight and geometry of a bait fish. Body 100 can be shaped and sized to mimic a wide variety of bait fish including herring, bluegills, sunfish, crappies, perch, suckers, bullheads, as well as other bait fish. In addition, body 100 can be shaped and sized to mimic cut bait. Body 100 can likewise be shaped in the form of other bait items such as leaches, worms, crayfish, frogs, and other types of creatures. Eyes can also be glued to body 100 or alternatively molded with body 100 as part of the injection process. The plastics used for body 100 can be clear or colored as desired. In addition, body 100 can be painted as desired after the molding process.

In one aspect, body 100 is composed of a plastisol material. Plastisol is typically a suspension of PVC particles in a liquid plasticizer that can flow as a liquid and be poured into a heated mold. When heated, the plastic and plasticizer will mutually dissolve each other. Upon cooling the mold, typically below 60 degrees C., a flexible and plasticized solid product results. In another aspect, the plastisol material used for body 100 can be composed of PVC Resin, phthalate or non-phthalate plasticizers, heat stabilizers, thickening agents, and pigments. In other aspects, body 100 typically can have a specific gravity less than 1.4, less than 1.3, less than 1.2 or less than 1.1. Body 100 can also have a specific gravity range from 0.9 to 1.50, or 1.0 to 1.40, or 1.027 to 1.075. Body 100 typically can have a durometer hardness of less than Shore 00 65, less than Shore 00 55, less than Shore 00 45, less than Shore 00 35, less than Shore 00 25, less than Shore 00 15. The body 100 hardness typically can likewise be less than Shore A 50, less than Shore A 40, less than Shore A 30, less than Shore A 20, less than Shore A 10, or less than Shore A 5. The body 100 hardness also can have a hardness from Shore 00 37 to Shore 00 48. In other aspects, body 100 typically can have a tensile strength of greater than 200 PSI, greater than 500 PSI, greater than 1,000 PSI, greater than 1,500 PSI, greater than 2,000 PSI, greater than 2,500 PSI and greater than 3,000 PSI. Body 100 could likewise be composed from metal rubber, which is a conductive plastic polymer with metal ions. Additionally, any other materials having properties not inconsistent with the purpose of the present invention can be used for body 100.

Figure 6:
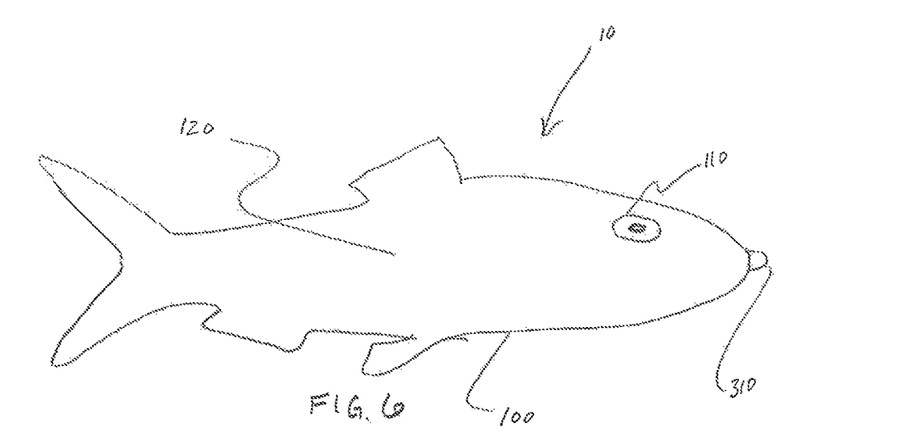
FIG. 6 is another side view of a fishing lure according to one aspect of the present invention.

Referring to FIG. 6, in another aspect body 100 can further include an eye 110. Eye 110 can be integral with body 100 or can added later by gluing the eye 110 onto body 100 or painting eye 110 onto body 100. In certain lure 10 configurations, eyes will not be included with the lure.

Body 100 can be composed of any desired color. Alternatively, body 100 can be composed from an at least partially transparent or translucent material. In one aspect, the lower, or belly, portion of body 100 is white or another bright color.

2. Wireform

Figure 1A:
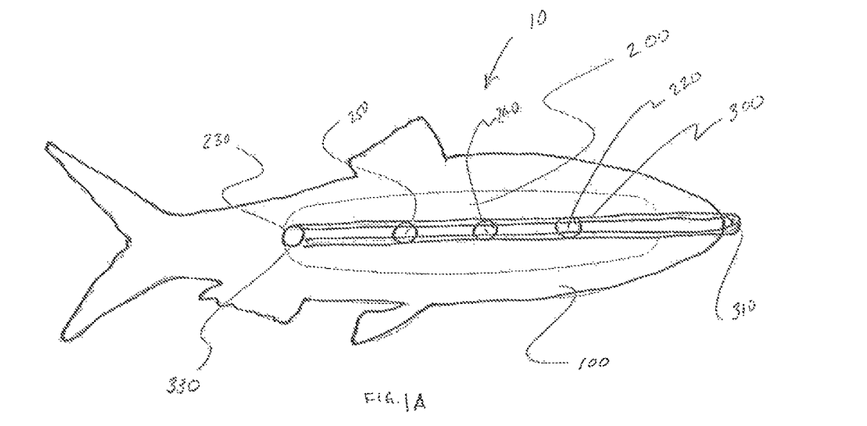
FIG. 1A is a side view of a fishing lure according to one aspect of the present invention.
Figure 1B:
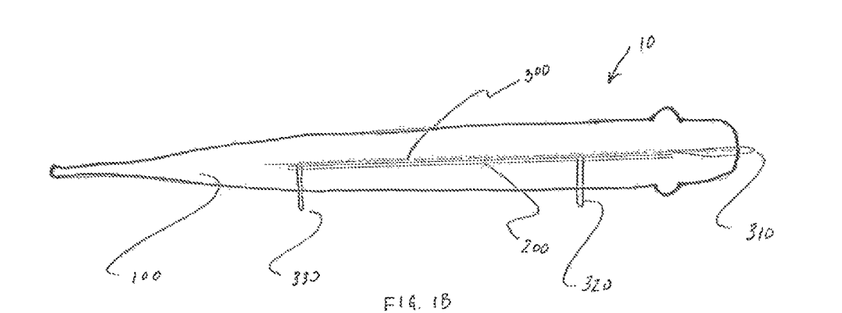
FIG. 1B is a top view of a fishing lure according to one aspect of the present invention.

Referring to FIGS. 1A and 1B, wireform 300 is shown. Wireform 300 typically includes hanger portions 310, 320, and 330, which typically protrude at least partially from the surface of body 100. Wireform 300 is typically embedded at least partially within body 100. Hanger portions, or hangers, 310, 320, and 330 can be used to interconnect lure 10 with other items such as fish hooks, fishing lines, or other items to which a fishing lure could be interconnected. Wireform 300 is typically constructed from a malleable material that can accommodate bending. In addition, wireform 300 is typically constructed from a material with a tensile strength sufficient to withstand the forces associated with various forms of fishing, including deep sea fishing. Wireform 300 is typically constructed from stainless steel. Wireform 300 can be constructed from a variety of materials, including without limitation single strand stainless steel, multi-strand braided wire, and multi-strand wound flexible wire. Wireform 300 is typically composed of a material having a tensile strength suitable for use in connection with fishing large predator fish or other fishing activities. In some aspects, wireform 300 can have a tensile strength greater than 100 KSI, greater than 150 KSI, greater than 200 KSI, greater than 250 KSI, greater than 300 KSI, or greater than 350 KSI. Any other material with properties that are suitable for bending and having sufficient tensile strength can likewise be used in connection with the present invention. In addition, materials having corrosion resistant properties (such as stainless steel), are particularly suitable for use in salt water fishing. Additionally, any other materials having properties not inconsistent with the purpose of the present invention can be used for wireform 300.

In one aspect of the invention, hangers 320 and 330 project from the lateral side of body 100 as shown in FIG. 1B. This configuration can foster rotation of the lure 10 as it moves through the water by moving the lure center of gravity away from the lure centerline, or longitudinal axis, especially when hooks (not shown) are affixed to hangers 320 and 330. In other aspects of the invention, hangers 320 and 330 can project from any other suitable orientation on the body 100. Hangers 320 and 330 can likewise be configured to project from any other desired surfaced of body 100. Hangers 320 and 330 can likewise be spaced at any desired position along the length, longitudinal axis, or other dimension of body 100.

Figure 2A:
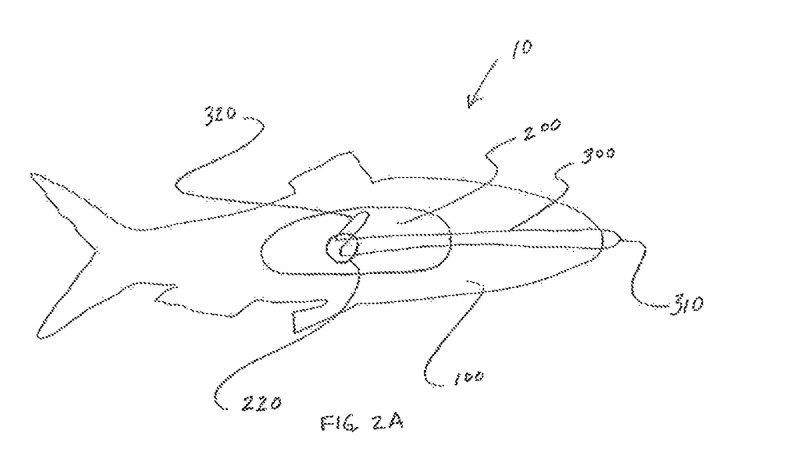
FIG. 2A is a side view of a fishing lure according to another aspect of the present invention.
Figure 2B:
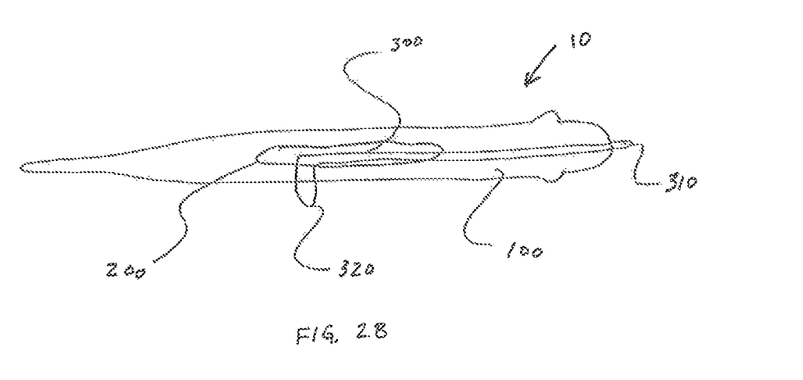
FIG. 2B is a top view of a fishing lure according to another aspect of the present invention.
Figure 3A:
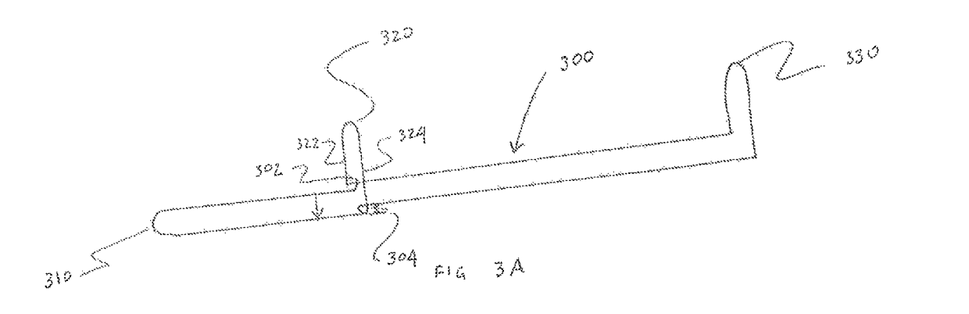
FIGS. 3A, 3B, 3C, 3D, and 3E are views of a wireform according to one aspect of the present invention.
Figure 3B:
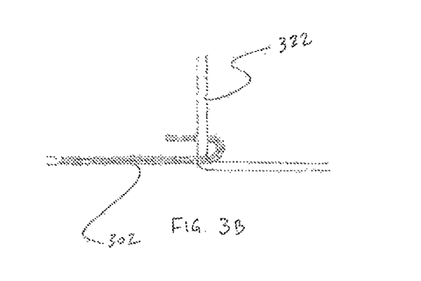
Figure 3C:
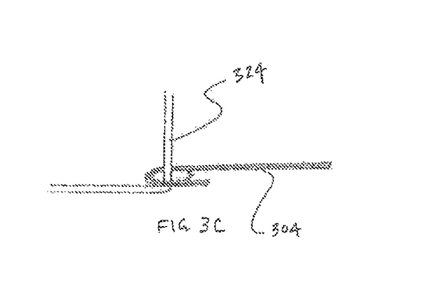
Figure 3D:
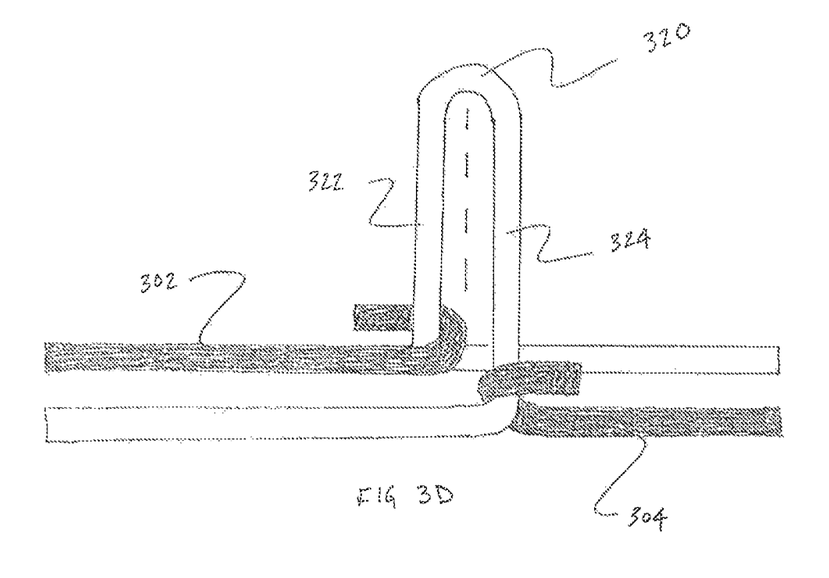
Figure 3E:
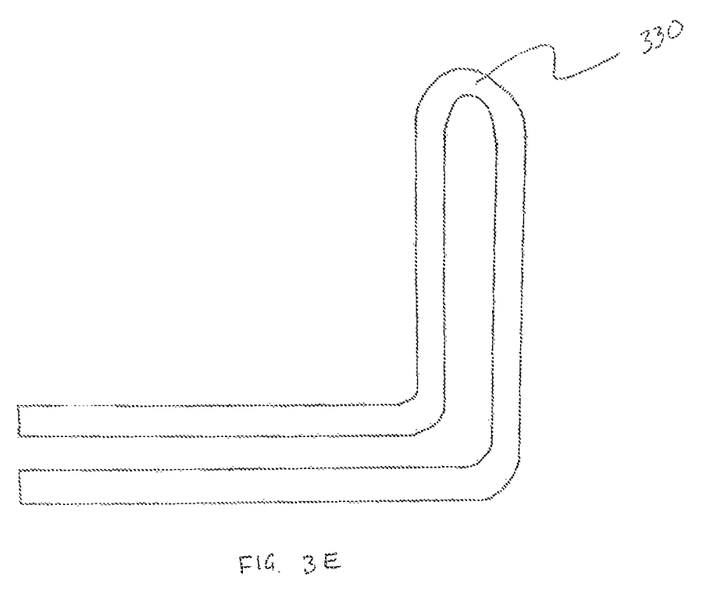

Referring to FIGS. 2A and 2B, another aspect of the invention is shown in which lure 10 includes body 100, adjustment plate 200, and wireform 300. Here, hanger 310 and hanger 320 are formed in wireform 300. Here, hanger 320 extends through aperture 220 and typically extends at least partially from the outer surface of body 100. In other aspects, wireform 300 can include additional hanger portions as desires, and these hangers will typically extend through apertures in plate 200.

FIGS. 3A, 3B, 3C, 3D, and 3E provide details regarding one type of wireform 300 that can be used in connection with the present invention. As shown, wireform 300 is typically created from a single piece of stainless steel wire that is bent to the shape as shown. As explained above, other materials can likewise be used for wireform 300. In addition, wireform 300 can be formed from multiple pieces of material as desired. As shown in FIGS. 3A, 3B, 3C, and 3D, the ends of wireform 300 are typically terminated by bending each end 302 and 304 around the legs 322 and 324 forming hanger 320. In other aspects, the ends 302 and 304 can be welded, soldered, or otherwise connected to the remainder of wireform 300. In other aspects, wireform 300 can be made a unitary piece of wire or other material. In other aspects, wireform 300 can be by casting, molding, or any other suitable manufacturing technique. In one aspect, wireform 300 can be positioned along the approximate centerline of body 100 as shown in FIGS. 1A and 2A. In other aspects, wireform 300 can be positioned at any other desired location relative to body 100, such as offset from the centerline of body 100. Wireform 300 can likewise be positioned at other locations proximate body 100 as well. In addition to the examples provided, any other structural element suitable for providing support not inconsistent with the purpose of lure 10 can be used for wireform 300.

3. Adjustment Plate

Referring to FIG. 1, adjustment plate, or insert, 200 is typically also embedded within body 100. Adjustment plate 200 is typically included in lure 10 to enable variable bending, twisting, or other geometry configuration of lure 10. As one example, such bending and twisting is typically utilized to cause lure 10 to simulate a wounded, dying, or otherwise distressed fish as it travels through the water because such fish typically attract predator fish. Adjustment plate is typically made from a ductile and malleable material that can be variably bent or otherwise adjusted to change the geometry of lure 10, and more specifically the geometry of body 100. The material used for plate 200 is typically of sufficient ductility and malleability to permit a fisherman or other user to bend or otherwise adjust the shape of lure 10 to a desired geometry. The material used for plate 200 is also typically of sufficient rigidity such that once lure 10 is shaped to a desired geometry, lure 10 retains the desired shape during fishing activities or other usages. The size, shape, and thickness of plate 200 can also be selected to enable lure 10 to better retain its geometry after a user has shaped the lure 10 to a desired geometry through bending, twisting, or other action upon lure 10. Adjustment plate 200 can be composed from sheet metal, stainless steel, aluminum, wire mesh, or any other suitable material. In one aspect, adjustment plate can be constructed from stainless steel have a thickness of at least 0.010 inch, 0.015 inch, 0.020 inch, 0.025 inch, 0.025 inch, or 0.030 inch. Any other sizes and thicknesses can be used for the material of plate 200 that are not inconsistent with the usage described herein. As shown in FIGS. 1A and 2A, the edges of plate 200 are typically rounded, which can reduce the likelihood that plate 200 will tear or otherwise damage body 100 during using of lure 10. Additionally, any shape not inconsistent with the purpose of lure 10 can typically be used for plate 200.

Referring to FIGS. 1 and 2, adjustment plate 200 typically includes apertures 220 and 230. Additional apertures, such as apertures 240 and 250, can also be included in adjustment plate 200. Adjustment plate 200 is typically interconnected with wireform 300 by extending hanger 320 through aperture 220 and extending hanger 330 through aperture 230. Adjustment plate 200 alternatively can be mechanically interconnected through other suitable methods such as welding, soldering, glue or other interconnection implements. As other alternative, adjustment plate need not be interconnected with wireform 300. In another aspect of the invention, additional hangers (not shown) could extend through apertures 240 and 250. In other aspects, additional apertures (not shown) can be included in plate 200, and in other aspects the number of apertures can be reduced as desired. The size of plate 200 can likewise be adjusted as desired based upon considerations including, without limitation, the size of body 100, the desired rigidity of lure 10, and the weight of lure 10.

In one aspect of the invention, the use of apertures such as apertures 220 and 230 in adjustment plate 200 can simplify the manufacturing process (discussed below) for interconnecting adjustment plate 200 with wireform 300. The use of such apertures typically eliminates the need for more complicated mechanical connections between adjustment plate 200 and wireform 300. In certain instances, however, such more complicated interconnections between adjustment plate 200 and wireform 300 may be desirable. In other aspects, adjustment plate 200 can be mechanically connected with the hangers, such as hangers 320 and 330. In other aspects, adjustment plate can integral with hangers, such as hangers 320 and 330, and also can be integral with a wireform, such as wireform 300.

In another aspect of the invention, adjustment plate 200 can include cuts or etchings on the outer surfaces of plate 200 to create a visually perceptible pattern on such outer surfaces. When body 100 is composed of an at least partially translucent or transparent material, these cuts or etchings would be visually perceptible through the surface of body 100, and in another aspect, could be used to reflect light and attract fish. In such instances, lure 10 would create flashes that could potentially attract fish to the lure.

4. Weights & Rattles

In another aspect of the invention, a weight 400 can be added to wireform 300 as shown in FIG. 6. Weight 400 can likewise be positioned at other locations on wireform 300 or at other positions in body 100. Weight 400 typically makes lure 10 easier to cast. In addition, weight 400 can typically enable certain fishing techniques such as fishing in deeper water or causing lure 10 to bounce on the water body floor without the need for downriggers or other additional weight systems. Additional weights can be included as desired. Weight 400, as well any other weight incorporated into lure 10, can be composed from a variety of materials such as lead or other metals. Weight 400 is typically composed of a material that has a specific gravity greater than 1.0.

Figure 5:
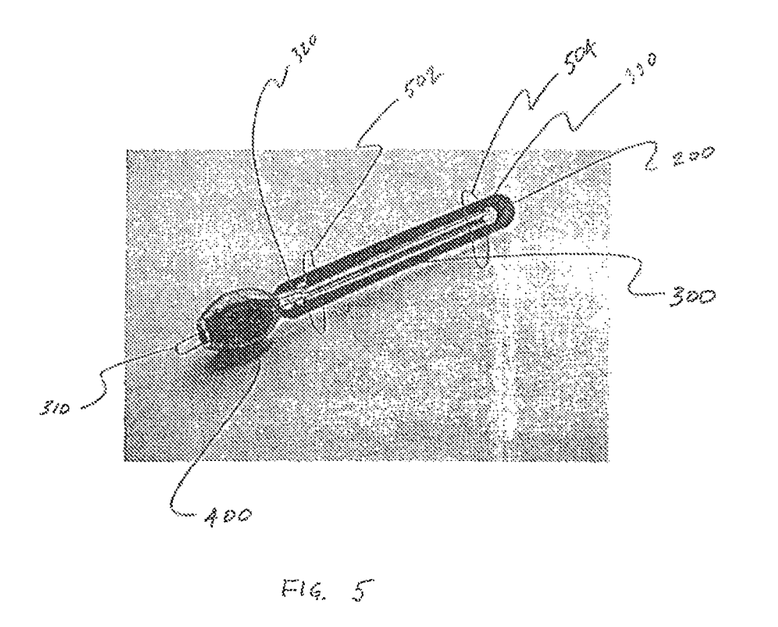
FIG. 5 is a view of a weight and rattles disposed on the wireform according to one aspect of the present invention.

In another aspect, one or more rattles, such as rattles 502 and 504 can be added to lure 10. As shown in FIG. 5, rattle 502 can be interconnected with hanger 320, and rattle 504 can be interconnected with hanger 330. Rattles 502 and 504 create a rattling noise that can attract fish to lure 10. Rattles 502 and 504 can be composed from hollow capsules that include one more beads inside the capsule.

5. Manufacturing

Figure 7A:
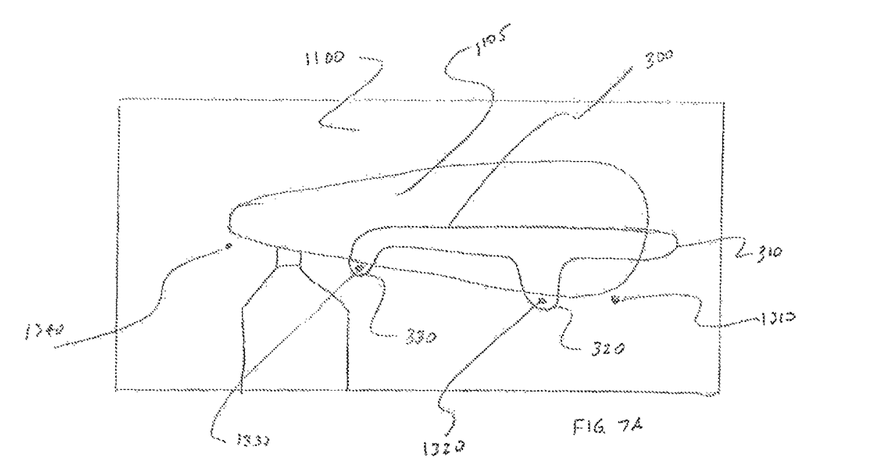
Figure 7B:
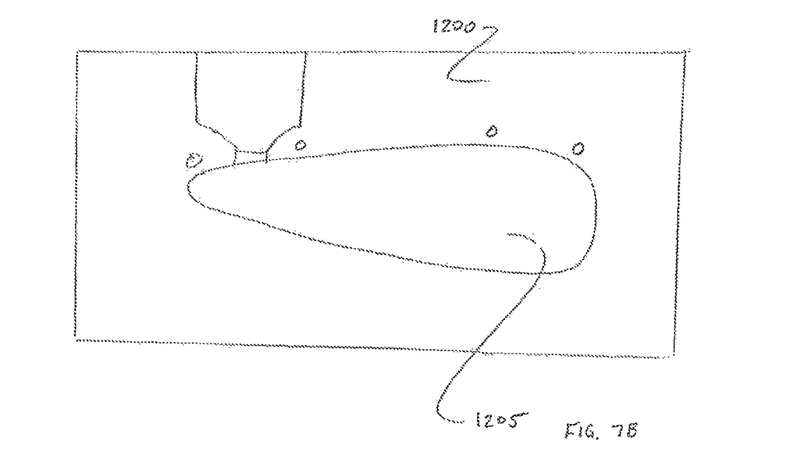

Following is one representative example of a technique for manufacturing lure 10. This example is representative only and is not intended to limit the scope of the claimed invention. Lure 10 is typically manufactured by preparing a mold in the shape of two halves of body 100 and inserting adjustment plate 200 and wireform 300 in the mold before the plastic is injected into the mold. Referring to FIGS. 7A and 7B, cavity mold plates 1100 and 1200 are shown. Mold plates 1100 and 1200 can be used to manufacture lure 10 according to another aspect of the invention. Cavity mold plates 1100 and 1200 typically can be designed to any design of bait fish or object, which will typically include details of fins, scales, eyes, and wireforms. The desired bait shape is then typically machined into the mold plates 1100 and 1200 that are sandwiched and have alignment pins 1320, 1330, and 1340 to insure proper alignment. Next, wireform 300 is typically inserted into mold plate 1100. After mold plates 1100 and 1200 are closed against one another, wireform 300 is located inside of the cavity 1105 and 1205. Mold plates 1100 and 1200 are then typically clamped to one another, and plastic, such as plastisol, is then typically either poured or injected under pressure into the cavity mold, which can be heated. In one aspect, lure 10 is formed through injection under pressure to promote consistency and prevent formation of any pockets or voids in lure 10. Once the plastic has sufficiently, cooled, mold plates 1100 and 1200 can be opened to release the molded lure 10. The manufacture of the lure 10 is not limited to the foregoing molding technique, as other molding techniques can also be used in accordance with the present invention. As another illustrative example, the mold can be a single cavity mold or a multi-cavity mold that would allow the lure to be molded with multiple colors.

6. Lure Use Example

Figure 4A:
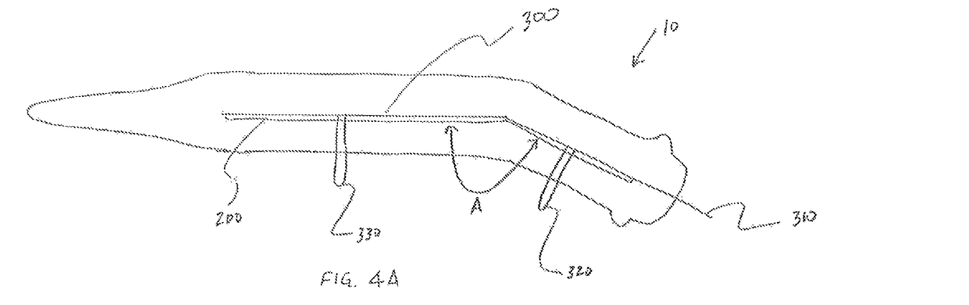
FIGS. 4A and 4B are top views of a bent fishing lure according to one aspect of the present invention.
Figure 4B:
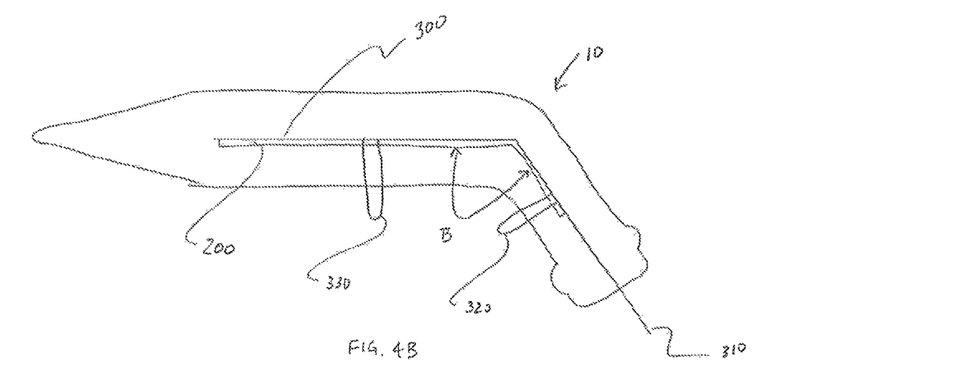

Following is a description of one representative example of how a fisherman or other user can use lure 10 according to the present invention. This example is for illustration only and does not limit application or use of the present invention. Referring to FIG. 4A, a fisherman (or other person using lure 10) will bend lure 10 such that wireform 300 and adjustment plate 200 are bent to a first angle, A, which in this example can be approximately 30 degrees, resulting in a bend to lure 10 of approximately thirty degrees. In other examples, lure 10 can be bent or twisted to other geometries as desired. A fishing line is attached to hanger 310, and fishhooks (not shown) are attached to hangers 320 and 330. Placing this bend in lure 10, coupled with the hangers extending away from the surface of plate 200, will typically cause lure 10 to rotate about its central axis as lure 10 is pulled through the water. If the fisherman decides that this thirty degree bend is not produced sufficient rotation at the selected trolling speed, fisherman can further bend lure to a second angle B, which in this example is forty-five degrees as shown in FIG. 4B. Alternatively, fisherman can bend lure 10 to any desired angle, typically between approximately zero and ninety degrees. The fisherman can bend or twist lure 10 to a wide variety of configurations depending upon the lure 10 movement that fisherman wished to cause. The fisherman can select a lure 10 that has the size, shape, and weight that simulates the desired baitfish. The fisherman can likewise adjust the geometry of lure 10 to cause lure 10 to simulate the movement in water of the desired baitfish. Following are several advantages stemming from the variable geometry of lure 10. Lure 10 imitates whole and cut bait. Lure 10 imitates a wounded fish or fish in distress. Varying the geometry of lure 10 can maximize the reflective properties of lure 10 to attract predator fish.

If the fisherman desires the lure to travel in deeper waters, the fisherman would use a lure 10 similar to the one shown in FIG. 5 that includes a weight 310. Weight 310 would cause the lure to sink to a lower water depth when compared to a lure 10 that does not include weight 310.

Figure 8:
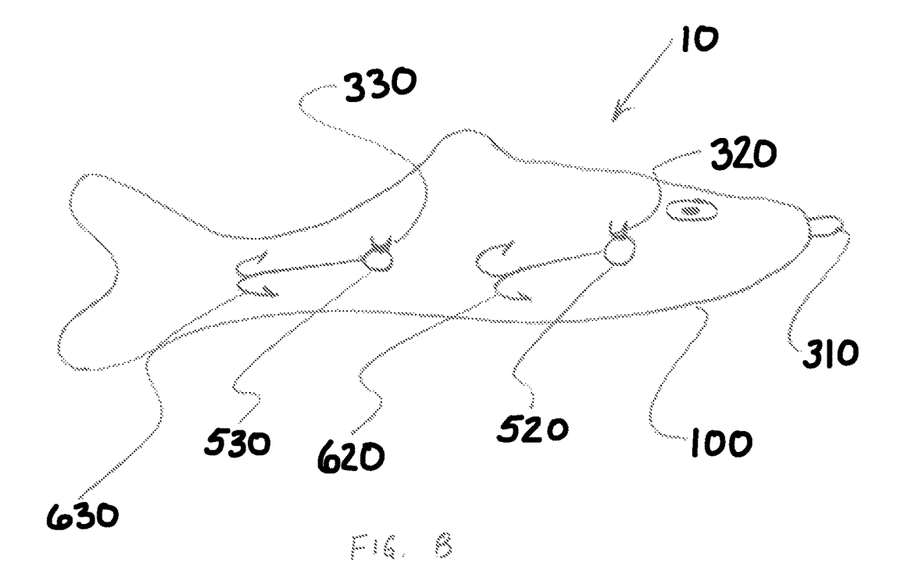
FIG. 8 is another side view of a fishing lure according to one aspect of the present invention.

In other aspects of the invention, referring to FIG. 8, hooks 620 and 630 are attached to hangers 320 and 330, with split rings 520 and 530. The hooks 620 and 630 can be of many different sizes. The use of split rings typically makes it easier to change hooks. Hook regulations can vary from state to state and waterway to waterway. Some places require barbless hooks and some require single hooks. For example Alaskan waters require no more than 3 hooks on 1 line. As an example, a fisherman could change 2 treble hooks on a lure to 2 single hooks or the fisherman could put a double hook on the rear hanger and a single on the front hanger. Some waters require one hook only. If that was the case the hook could go on either hanger, leaving the other hanger empty.

All patents, patent publications, and peer-reviewed publications (i.e., "references") cited herein are expressly incorporated by reference to the same extent as if each individual reference were specifically and individually indicated as being incorporated by reference. In case of conflict between the present disclosure and the incorporated references, the present disclosure controls.

It is understood that the invention is not confined to the particular construction and arrangement of parts herein illustrated and described, but embraces such modified forms thereof as come within the scope of the claims.

What is claimed is:

1. A fishing lure, comprising:
   a wireform having a first end and a second end and a front end and a rear end;
   a bendable insert having a first side surface and a second side surface opposite the first side surface;
   a body having an outer surface;
   a first hanger portion formed proximate the front end of the wireform and extending in a direction along a longitudinal axis of the wireform;
   a second hanger portion disposed proximate the rear end of the wireform, extending through a first aperture formed in the insert from the first side surface of the insert to the second side surface of the insert, and extending in a direction transverse to the longitudinal axis of the wireform; and
   a third hanger portion disposed between the front end and the rear end of the wireform, the third hanger portion formed by a first leg and a second leg in the wireform and extending through a second aperture in the bendable insert formed from the first side surface of the bendable insert to the second side surface of the bendable insert, and extending only in a single direction transverse to the longitudinal axis of the wireform,
   wherein the wireform and insert are positioned at least partially inside the outer surface of the body,
   wherein the first end of the wireform is terminated at the first leg by bending the first end of the wireform around the first leg, and
   wherein the second end of the wireform is terminated at the second leg by bending the second end of the wireform around the second leg.

2. The fishing lure of claim 1, wherein the wireform and bendable insert are molded integral with the body.

3. The fishing lure of claim 1, wherein the first hanger portion, second hanger portion, and third hanger portion each extend at least partially beyond the outer surface of the body.

4. The fishing lure of claim 1, wherein the bendable insert has rounded edges.

5. The fishing lure of claim 1, wherein the wireform is comprised of a single piece of material.

6. The fishing lure of claim 1, wherein the wireform is comprised of at least two pieces of material.

7. The fishing lure of claim 1, wherein the bendable insert is comprised of stainless steel.

8. The fishing lure of claim 1, wherein the bendable insert is comprised of a stainless steel mesh.

9. The fishing lure of claim 1, further comprising a weight having an aperture, wherein the front end of the wireform extends through the aperture in the weight.

10. The fishing lure of claim 1, further comprising a rattle disposed inside the body.

\* \* \* \* \*